Nov. 11, 1930.  C. P. COOK  1,781,367
PORK LOIN BRANDER
Filed Feb. 19, 1930
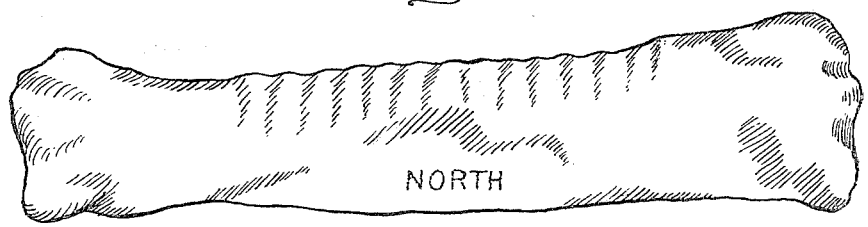
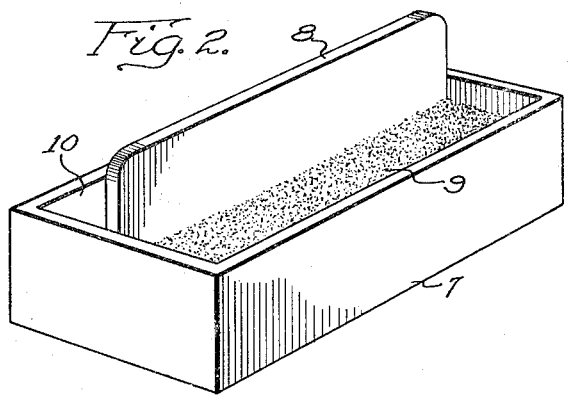
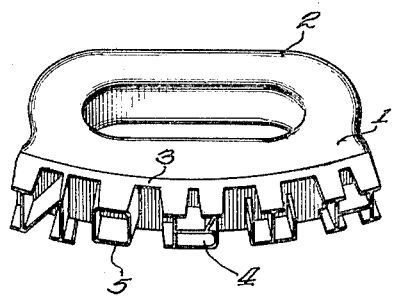
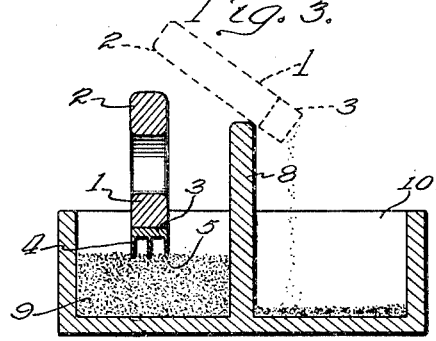
Witness
Arthur M. Framke.
Inventor
Calvin P. Cook.
By Rummler, Rummler & Woodworth
Attys.

Patented Nov. 11, 1930

1,781,367

UNITED STATES PATENT OFFICE

CALVIN P. COOK, OF ARLINGTON, MASSACHUSETTS, ASSIGNOR TO SWIFT AND COMPANY, OF CHICAGO, ILLINOIS, A CORPORATION OF ILLINOIS

PORK-LOIN BRANDER

Application filed February 19, 1930. Serial No. 429,646.

This invention relates to the branding of meats, particularly pork loins.

The object of this invention is to provide improved method of branding meats by impressing a cutting or penetrating tool upon the surface of the meat, and at the same time applying a dry pigment which brings the brand out in contrast with the remaining surface of the meat.

In the drawings,

Figure 1 represents a cut of meat such as a pork loin, with the brand applied thereto.

Fig. 2 shows in perspective a suitable form of dry pigment container.

Fig. 3 is a transverse sectional view of the pigment container and illustrates how the pigment is applied to the branding tool.

Fig. 4 is a perspective view of a branding tool suitable for carrying out the purpose of the invention.

This invention is based upon the idea of using a harmless pigment, such as powdered paprika, for branding meat, instead of a liquid ink. It is found in practice that such powdered pigment may be applied to the meat by means of a branding tool that makes a slight incision in the surface of the meat and that the tool after being applied to the meat, such as the fatty surface of pork loins, carries sufficient grease on its cutting edges to cause the paprika powder to adhere to the tool in substantially the right quantity for one or two branding impressions. In order to get clear cut impressions, it is important to use a minimum of paprika and avoid accumulations that would make a smear. In carrying out the process, the side of the tool is struck against an abutment after it is dipped into the powdered pigment. This causes any lumps adhering to the tool to be dislodged therefrom while the required amount of the pigment remains upon the cutting edges thereof. The resulting mark upon the meat is of a bright distinctive character, and neat in appearance, since the edges of the cuts made by the tool are brightly colored with a pigment which is deposited only in the grooves made by the brand and which has no tendency to spread into the tissue and thus become blurred, as ink does.

There is also no known objection to paprika as being a foreign substance on the meat.

Means for carrying out the above described process may be such as illustrated in the drawing. The branding device is preferably curved so that the brand printing characters thereon may be caused to cut into and penetrate the surface of the meat by a rocking motion applied to the branding tool. The tool shown is formed of a wood back 1 and handle 2, and a metallic facing 3, carrying thin blade like type characters 4, about one-half inch in depth, and having knife edges 5 at the operating surface.

For convenience in dislodging excess quantities or lumps of pigment from the tool, the pigment container 7 is provided with a central abutment or bridge 8, extending upwardly above the side edges of the container. After the tool is dipped into the compartment 9, containing the powdered paprika, the side of the tool is struck against the bridge 8, causing the excess of pigment to fall into compartment 10. The edges of the characters on the tool will then carry sufficient pigment for one or two branding operations. Each branding operation consists in rocking the tool once over the surface of the meat with sufficient pressure to force the edges of the type on the brand slightly into the fatty surface of the meat.

I claim:

1. The method of branding meat which consists in cutting the identification marks into the surface of the meat and simultaneously applying a powdered pigment to the cuts.

2. The method of branding meats which consists in cutting identifying marks on a fatty surface of the meat by means of a tool coated with dry powdered pigment.

3. The method of branding meat which consists in inserting powdered paprika into identifying cuts on the fatty surface of the meat.

4. The method of branding meats which consists in uniformly coating a cutting tool with powdered pigment and causing same to penetrate a fatty surface of the meat.

5. The process of applying identification marks to the surfaces of fatty meats, which consists in cutting identification marks upon the surface of the meat and at intervals dipping the cutting tool into a powdered pigment and jarring excess pigment and fat from the tool by a blow at the side of the tool.

Signed at Arlington this sixth day of February, 1930.

CALVIN P. COOK.